US009062457B2

United States Patent
Gilling et al.

(10) Patent No.: US 9,062,457 B2
(45) Date of Patent: Jun. 23, 2015

(54) ASSEMBLY AND METHOD FOR ANCHORING REBAR TO A MASS

(71) Applicants: Robert Gilling, Caro, MI (US); Carrick Pierce, Pacific Grove, CA (US); Eng Kiat Tng, Singapore (SG); Shuangyou Liu, Guangxi (CN); Brent Bennett, Gold Canyon, AZ (US)

(72) Inventors: Robert Gilling, Caro, MI (US); Carrick Pierce, Pacific Grove, CA (US); Eng Kiat Tng, Singapore (SG); Shuangyou Liu, Guangxi (CN); Brent Bennett, Gold Canyon, AZ (US)

( * ) Notice: Subject to any disclaimer, the term of this patent is extended or adjusted under 35 U.S.C. 154(b) by 0 days.

(21) Appl. No.: 14/178,119

(22) Filed: Feb. 11, 2014

(65) Prior Publication Data

US 2014/0223854 A1    Aug. 14, 2014

Related U.S. Application Data

(60) Provisional application No. 61/762,980, filed on Feb. 11, 2013, provisional application No. 61/762,978, filed on Feb. 11, 2013.

(51) Int. Cl.
*E04C 5/12* (2006.01)
*E02D 5/74* (2006.01)
(Continued)

(52) U.S. Cl.
CPC ............... *E04C 5/122* (2013.01); *Y10T 403/50* (2015.01); *Y10T 403/3986* (2015.01); *E02D 5/74* (2013.01); *E21D 21/0086* (2013.01); *E04C 5/165* (2013.01); *E04G 21/12* (2013.01); *E04G 21/121* (2013.01)

(58) Field of Classification Search
CPC ......... E04C 5/122; E04C 5/163; E04G 21/12; E04G 21/121; E02D 5/74; E02D 29/0233; E21D 21/008; E21D 21/0086
USPC ............... 52/223.13, 745.21; 405/259.4, 262; 24/135 R, 136 R, 115 M; 403/314
See application file for complete search history.

(56) References Cited

U.S. PATENT DOCUMENTS 1,258,580 A * 3/1918 Lassiter ..................... 403/374.4
2,699,589 A * 1/1955 Redell ........................ 294/102.1
(Continued)

FOREIGN PATENT DOCUMENTS

CA    2515758 A1    2/2006
CN    2186274 Y    12/1994
(Continued)

OTHER PUBLICATIONS

Collet Assembly, Milwaukee Tools, Webpage, http://www.milwaukeetool.com/accessories/miscellaneous/48/66/2090.
(Continued)

*Primary Examiner* — Robert Canfield
(74) *Attorney, Agent, or Firm* — Dickinson Wright PLLC (57) ABSTRACT

A method and assembly for anchoring a segment of rebar and a plate to a mass. The assembly includes a barrel extending about and along an axis and defining a bore extending therethrough along the axis with the bore being tapered. A wedge having a frustoconical shape extends about and along the axis. The wedge is tapered in conformity with the bore of the barrel for being received by the barrel. A cap is connected to the barrel for closing the barrel. The method includes the step threadedly tightening the cap about the barrel in axial abutment to close the barrel, and further the step of compressing the wedge axially into the bore of the barrel to drive the wedge radially inwardly to provide for a biasing force of the wedge against the rebar prior to said step of threadedly tightening the cap about the barrel.

8 Claims, 7 Drawing Sheets

(51) Int. Cl.
  *E21D 21/00* (2006.01)
  *E04C 5/16* (2006.01)
  *E04G 21/12* (2006.01)

(56) References Cited

U.S. PATENT DOCUMENTS

| | | | | |
|---|---|---|---|---|
| 2,896,496 | A * | 7/1959 | Jansen | 411/347 |
| 2,916,785 | A * | 12/1959 | Daugert | 24/136 R |
| 2,935,299 | A * | 5/1960 | Jansen | 254/29 A |
| 3,090,598 | A * | 5/1963 | Odilo | 254/29 A |
| 3,117,485 | A * | 1/1964 | Jansen | 411/427 |
| 3,163,904 | A * | 1/1965 | Ziolkowski | 403/365 |
| 3,176,961 | A * | 4/1965 | Glass | 254/29 A |
| 3,361,460 | A * | 1/1968 | Jansen | 403/16 |
| 3,478,396 | A * | 11/1969 | Drouillard | 403/371 |
| 3,701,509 | A * | 10/1972 | Stinton et al. | 254/29 A |
| RE27,954 | E * | 4/1974 | Kelly | 403/369 |
| 3,820,832 | A | 6/1974 | Brandestini et al. | |
| 3,971,177 | A | 7/1976 | Endo | |
| 4,023,242 | A * | 5/1977 | Caro Roqueta | 24/122.6 |
| 4,114,242 | A * | 9/1978 | Luthi | 24/115 R |
| 4,143,986 | A | 3/1979 | Antosh | |
| 4,469,465 | A | 9/1984 | Andrus | |
| 4,604,003 | A * | 8/1986 | Francoeur et al. | 405/256 |
| 4,641,816 | A * | 2/1987 | Kishida et al. | 254/228 |
| 4,773,198 | A * | 9/1988 | Reinhardt | 52/223.13 |
| 4,819,393 | A * | 4/1989 | Augoyard | 52/223.13 |
| 4,911,582 | A | 3/1990 | Pierce, Jr. et al. | |
| 5,308,184 | A | 5/1994 | Bernard | |
| 5,347,777 | A * | 9/1994 | Sudduth | 52/223.13 |
| 5,511,909 | A * | 4/1996 | Calandra et al. | 405/259.6 |
| 5,525,013 | A | 6/1996 | Seegmiller et al. | |
| 5,809,710 | A * | 9/1998 | Jungwirth et al. | 52/223.1 |
| 5,829,922 | A * | 11/1998 | Calandra et al. | 405/302.2 |
| 6,023,894 | A * | 2/2000 | Sorkin | 52/223.8 |
| 6,224,036 | B1 * | 5/2001 | Prince et al. | 254/29 A |
| 6,565,288 | B1 | 5/2003 | McCallion | |
| 6,626,610 | B1 * | 9/2003 | Seegmiller | 405/259.5 |
| 6,684,585 | B2 * | 2/2004 | Campbell | 52/223.13 |
| 7,743,580 | B2 | 6/2010 | DeLoach, Sr. | |
| 7,819,388 | B2 | 10/2010 | McCallion | |
| 8,251,617 | B2 | 8/2012 | Leppanen | |
| 8,313,345 | B2 | 11/2012 | Purdy | |
| 8,388,377 | B2 | 3/2013 | Zraik | |
| 8,398,421 | B2 | 3/2013 | Haberek et al. | |
| 8,413,396 | B2 | 4/2013 | Oliva et al. | |
| 8,702,066 | B2 * | 4/2014 | Steidinger et al. | 254/228 |
| 2002/0001504 | A1 | 1/2002 | McCallion | |
| 2002/0157333 | A1 * | 10/2002 | Kadotani et al. | 52/223.2 |
| 2004/0040247 | A1 | 3/2004 | Morse | |
| 2006/0059841 | A1 | 3/2006 | Bennett et al. | |
| 2007/0175128 | A1 * | 8/2007 | McCallion | 52/223.13 |
| 2009/0041550 | A1 | 2/2009 | Oldsen et al. | |
| 2009/0191006 | A1 * | 7/2009 | Seegmiller | 405/259.4 |
| 2009/0191007 | A1 * | 7/2009 | Seegmiller | 405/259.5 |
| 2009/0304441 | A1 * | 12/2009 | Landry | 403/314 |
| 2011/0168960 | A1 * | 7/2011 | Steidinger et al. | 254/228 |
| 2012/0011800 | A1 | 1/2012 | Moseid | |
| 2012/0233956 | A1 | 9/2012 | Fey | |
| 2014/0020328 | A1 | 1/2014 | Yee | |
| 2014/0227024 | A1 * | 8/2014 | Gilling et al. | 403/286 |

FOREIGN PATENT DOCUMENTS

| | | | | |
|---|---|---|---|---|
| DE | 3339125 A1 * | 5/1985 | | E04C 5/08 |
| FR | 2439856 A3 | 5/1980 | | |
| FR | 2708017 A1 | 1/1995 | | |
| JP | H1181555 A | 3/1999 | | |
| JP | 2006219912 A | 8/2006 | | |
| WO | 9740242 A1 | 10/1997 | | |

OTHER PUBLICATIONS

Die Grinder Collet ⅛", Milwaukee Tools, Webpage, http://www.milwaukeetool.com/accessories/miscellaneous/48/66/0965.

Collet Nut ¼", Milwaukee Tools, Webpage, http://www.milwaukeetool.com/accessories/miscellaneous/48/68/0031.

Collet Body ¼", Milwaukee Tools, Webpage, http://www.milwaukeetool.com/accessories/miscellaneous/48/68/0040.

International search report mailed Jun. 10, 2014 (PCT/US2014/015865).

* cited by examiner

ASSEMBLY AND METHOD FOR ANCHORING REBAR TO A MASS

CROSS REFERENCE TO RELATED APPLICATION

This application claims the benefit of application Ser. No. 61/762,980, filed on Feb. 11, 2013, and application Ser. No. 61/762,978, filed on Feb. 11, 2013, which are hereby incorporated by reference as though set forth fully herein. This application cross references U.S. patent application Ser. No. 14/178,143 entitled "Assembly for Connecting Rebar Segments," which is filed concurrently herewith and which is incorporated by reference as though set forth fully herein.

BACKGROUND OF THE DISCLOSURE

1. Field of the Disclosure

A method and assembly for anchoring a segment of rebar to a mass.

2. Description of the Prior Art

Apparatuses and methods for anchoring segments of rebar into a mass are known in the art. A common application for such apparatuses and methods is in the construction industry, wherein the mass is a retaining wall of an excavation site used to reinforce structures such as bridges or roads, and the rebar is a soil nail used in combination with a plate disposed about and secured to the soil nail to reinforce the retaining wall.

An example of such an assembly and method is disclosed in U.S. Pat. No. 7,819,388 to James P. McCallion. The assembly includes a segment of rebar for being disposed in a mass. A wedge extends about and along an axis and defines a hollow extending therethrough along the axis and is disposed about the rebar axially adjacent to the mass. A barrel extends about and along the axis and defines a bore being tapered extending therethrough along the axis and receiving the wedge. The assembly also includes a cap having a hexagonal shaped exterior and threaded interior for threadedly pushing the wedge axially into the barrel to drive the wedge radially inwardly toward the rebar to secure the wedge to the barrel and for closing the barrel to inhibit movement of the wedge out of the barrel. The method includes the steps of extending the segment of rebar axially into the mass, extending the bore of the barrel about the rebar, extending the hollow of the wedge about the rebar axially adjacent to the mass, and threadedly connecting the cap to the barrel to close the barrel to drive axially drive the wedge into the barrel and to inhibit movement of the wedge out of the barrel.

Such a method and apparatus suffers from certain drawbacks, as it is difficult for an operator to provide for a sufficient axial force of the cap against the wedge to adequately secure the wedge to the rebar such that the assembly can withstand forces exerted by the retaining wall over long periods of time, as the cap of such assemblies is typically driven by an operator with a wrench, which tends to provide for an inadequate amount of torque on the cap, and the threads of the cap are prone to stripping.

SUMMARY AND ADVANTAGES OF THE DISCLOSURE

The disclosure provides for such a method and further including the step of compressing the wedge axially into the bore of the barrel to drive the wedge radially inwardly to provide for a biasing force of the wedge against the rebar prior to the step of connecting the cap to the barrel to close the barrel.

The disclosure also provides for an assembly for anchoring a segment of rebar and a plate disposed about the rebar to a mass comprising a wedge of metal material having a frustoconical shape with a rear end and front end and extending along and about an axis from the rear end to the front end, the wedge defining a hollow extending therethrough along the axis for receiving the rebar, the wedge being tapered from the rear end to the front end, the hollow defining a plurality of teeth for gripping the rebar to inhibit axial movement of the wedge relative to the rebar, the wedge being divided into a plurality of sections of equal size and shape and each including a pair of radial faces extending radially inwardly toward the axis and extending parallel to the axis, the wedge defining a groove extending circumferentially about the wedge around each of the segments axially adjacent to the rear end, a restraining device disposed in the groove of the wedge biasing the sections of the wedge radially inwardly for biasing the wedge against the rebar and the radial faces toward one another, a barrel of metal material having a generally cylindrical shape and having a proximal extremity and a distal extremity extending along and about the axis between the proximal extremity and the distal extremity, the barrel defining a barrel diameter constant and being threaded between the extremities, the barrel defining a bore extending therethrough along the axis for receiving the front end of the wedge, the bore being tapered from the proximal extremity toward the distal extremity at the same angle for mating engagement with the wedge for driving the wedge radially inwardly in response to the wedge being in the bore and axially engaged by the barrel, a cap having a hexagonal shaped cross-section with a back surface being closed and extending about and along the axis from the back surface to a rim defining an opening, the back surface defining a hole having a circular shape extending therethrough along the axis for receiving the segment of rebar, the opening being threaded internally of the rim and extending axially from the rim for threadedly receiving the proximal extremity of the barrel for restricting axial movement of the wedge relative to the barrel, and a spring washer for being disposed about the rebar and axially sandwiched between the cap and the wedge for distributing the force of the cap against the wedge and for compensating for movement of the segment of rebar relative to the barrel.

The disclosure also provides for a method for connecting a first segment of rebar and a second segment of rebar including the steps of extending the bore of the barrel partially about the first segment of rebar, extending the bore of the barrel partially about the second segment of rebar, extending the hollow of the wedge about the first and second segments of rebar, connecting the cap to the barrel to close the barrel to inhibit movement of the wedge out of the barrel, compressing the wedge axially into the bore of the barrel to drive the wedge radially inwardly to provide for a biasing force of the wedge against the first and second segments of rebar prior to said step of connecting the cap to the barrel to close the barrel.

Thus several advantages of one or more aspects of the disclosure are that the step of compressing the wedge axially into the bore of the barrel prior to the step of connecting the cap to the barrel to close the barrel allows a greater force to be exerted on the wedge since a variety of different compressing tools can be used which provide for a greater amount of torque, and such tools are not dependent on the threads of the cap withstanding the force received therefrom.

Further, with regard to the method of connecting a first segment of rebar and a second segment of rebar, the method could advantageously be used to couple any two segments of rebar with or without threads. Additionally, compressing tools can advantageously be used to axially drive the wedge into the bore of the barrel about the first and second rebar segments, allowing the wedge to be "preloaded" at or near yield strength of the rebar prior to placement of the cap. This advantageously inhibits movement of the wedge relative to the segments of rebar in response to large external forces against the segments of rebar.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE ENABLING EMBODIMENTS

An assembly 20, 120 for anchoring a segment of rebar 22 and a plate 24 disposed about the rebar 22 to a mass 26 is generally shown. In the enabling embodiments, the mass 26 is a retaining wall 26 of an excavation site, as commonly used in the construction industry to reinforce structures such as bridges, roads, or buildings adjacent to the excavation site. Further, the segment of rebar 22 is a soil nail 22 as commonly used for reinforcing such retaining walls 26. The plate 24 is disposed about the rebar 22 and is held in place by the assembly 20, 120 against the retaining wall to prevent deflection of the retaining wall 26 past the plate 24. It should be appreciated that the assembly 20, 120 could be used with any type of rebar 22 and could be used to support other masses 26, such as but no limited to, other concrete foundations like a micropile or a rock bolt/anchor.

The assembly 20, 120 includes a wedge 28, 128, generally indicated, of metal material that has a frustoconical shape with a rear end 30 and front end 32. The wedge 28, 128 extends along and about an axis A from the rear end 30 to the front end 32 and is tapered between the rear end 30 and the front end 32. The wedge 28, 128 defines a hollow 34 that extends therethrough between the rear and the front end 30, 32 along the axis A for receiving the rebar 22. The hollow 34 defines a plurality of teeth 36 for gripping the rebar 22 to inhibit axial movement of the wedge 28, 128 relative to the rebar 22. The wedge 28, 128 is divided into a plurality of sections 37 of equal size and shape. Each of the sections 37 includes a pair of radial faces 38 extending radially inwardly toward the axis A and extending parallel to the axis A. It should be appreciated that the wedge 28, 128 could be comprised of any number of segments and the wedge 28, 128 could be made of other materials, such as but not limited to organic polymeric materials.

The wedge 28, 128 defines a groove 40 that extends circumferentially about the wedge 28, 128 around each of the sections 37 at a location axially adjacent to the rear end 30. An O-ring 42 is disposed in the groove 40 of the wedge 28, 128 to bias the sections 37 of the wedge 28, 128 radially inwardly for biasing the wedge 28, 128 against the rebar 22 and the radial faces 38 toward one another. It should be appreciated that temporary other restraining devices 42 could be used as an alternative to the O-ring, such as but not limited to, a spring.

A generally cylindrical shaped barrel 44, 144, generally indicated, of metal material that has a proximal extremity 46 and a distal extremity 48 extends along and about the axis A between the proximal extremity 46 and the distal extremity 48. The barrel 44, 144 defines a constant outer barrel diameter $B_d$ and is threaded between the extremities 46, 48. The barrel 44, 144 further defines a bore 50 that extends therethrough along the axis A for receiving the front end 32 of the wedge 28, 128. The bore 50 is tapered from the proximal extremity 46 toward the distal extremity 48 at the same angle as that of the wedge 28, 128 for mating engagement with the wedge 28, 128 for driving the wedge 28, 128 radially inwardly in response to the wedge 28, 128 being in the bore 50 and axially engaged by the barrel 44, 144. It should be appreciated that the barrel 44, 144 could be made of other materials such as, but not limited to, an organic polymeric material.

Figure 8:
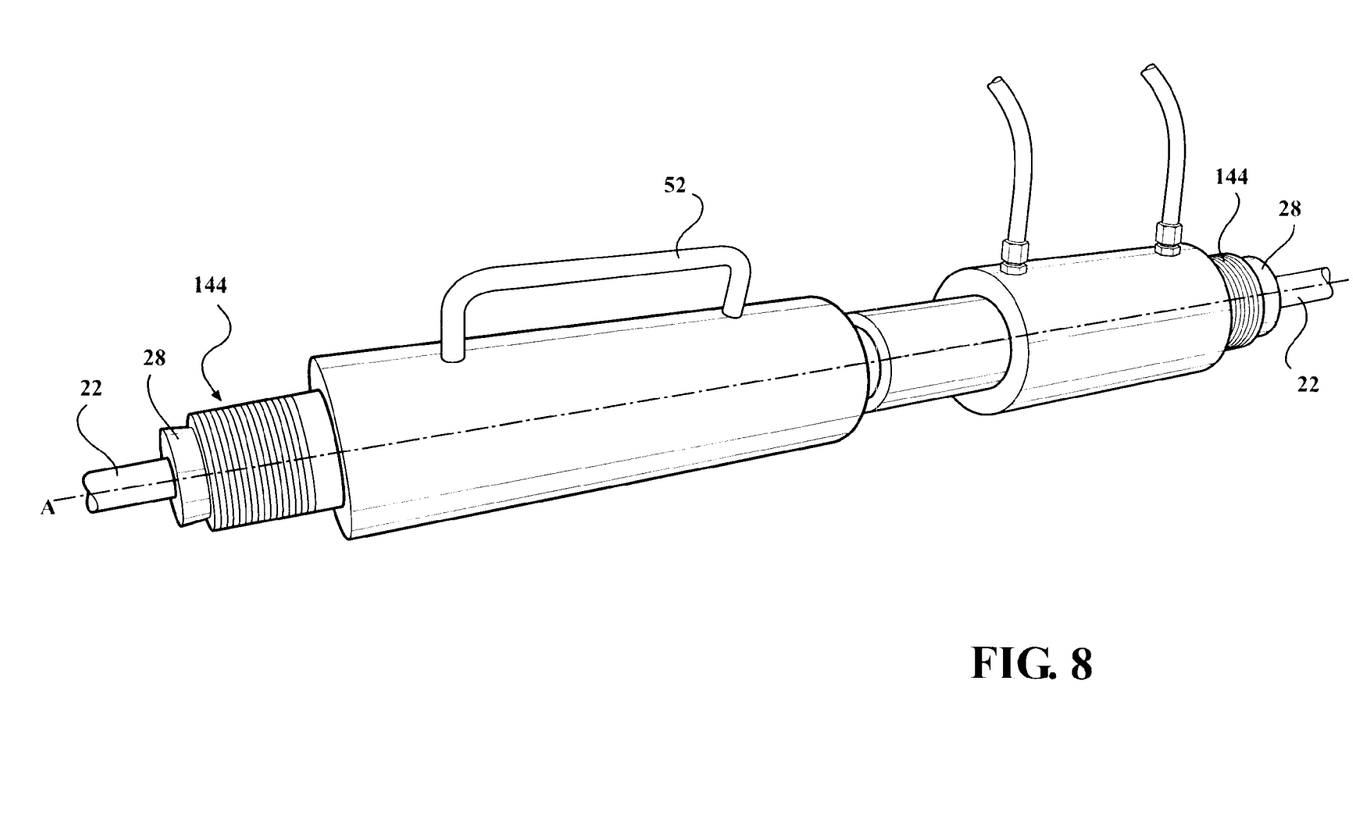
FIG. 8 is a perspective view of the hydraulic actuator and the wedge and barrel of the second enabling embodiment.

In an embodiment of the disclosure, the wedge 28, 128 is axially compressed in the barrel 44, 144 by use of a hydraulic actuator 52 including a piston being moveable extending therefrom, as best presented in FIG. 8. More specifically, the hydraulic actuator 52 is positioned such that it fixedly engages the rebar 22 and axially pushes the wedge 28, 128 into the bore 50 of the barrel 44, 144. It should be appreciated that such a hydraulic actuator 52 could alternatively be configured to pull the wedge 28, 128 into the barrel 44, 144 from the opposite axial direction. Further, it should be appreciated that the wedge 28, 128 could be compressed within the barrel 44, 144 in various other ways, such as but not limited to, by using a conventional C-clamp, other hydraulic actuators of the spreading or clamping type, or other compression devices that either engage or do not engage the rebar.

A cap 56, generally indicated, that has a hexagonal shaped cross-section with a back surface 58 that is closed extends about and along the axis A from the back surface 58 to a rim 60 that defines an opening 62. The back surface 58 defines a circular shaped hole 64 that extends therethrough along the axis A for receiving the segment of rebar 22. The opening 62 is threaded internally of the rim 60 and extends axially from the rim 60 for threadedly receiving the proximal extremity 46 of the barrel 44, 144 for inhibiting axial movement of the wedge 28, 128 relative to the barrel 44, 144 after the wedge 28, 128 has been driven into the barrel 44, 144. It should be appreciated that the cap 56 could have other shapes, such as but not limited to, a circular shaped cross section 37.

A spring washer 66 is disposed about the rebar 22 and is axially sandwiched between the cap 56 and the wedge 28, 128 for distributing the force of the cap 56 against the wedge 28, 128 and for compensating for movement of the segment of rebar 22 relative to the barrel 44, 144, which can occur during shifting of the mass 26. It should be appreciated that the assembly 20 could be constructed with or without the spring washer 66.

A protrusion 70 that has a cylindrical shape extends from the distal extremity 48 of the barrel 44, 144 along and about the axis A. The protrusion 70 defines a protrusion diameter $P_d$ that is smaller than said barrel diameter $B_d$. It should be appreciated that the assembly could alternatively be made with the protrusion 70.

Figure 1:
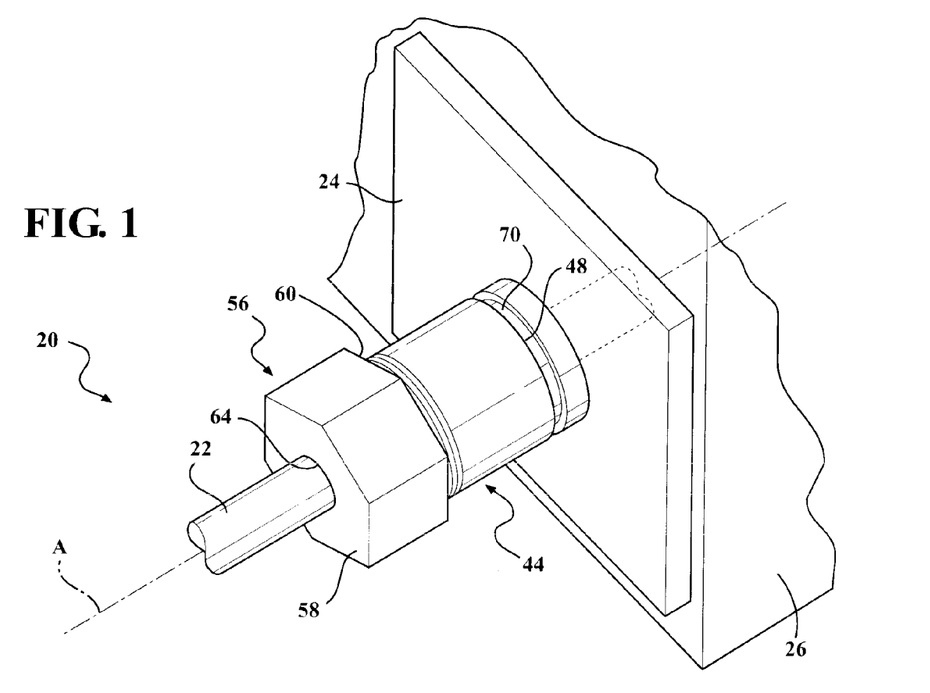
FIG. 1 is a perspective view of the first enabling embodiment of the assembly.
Figure 2:
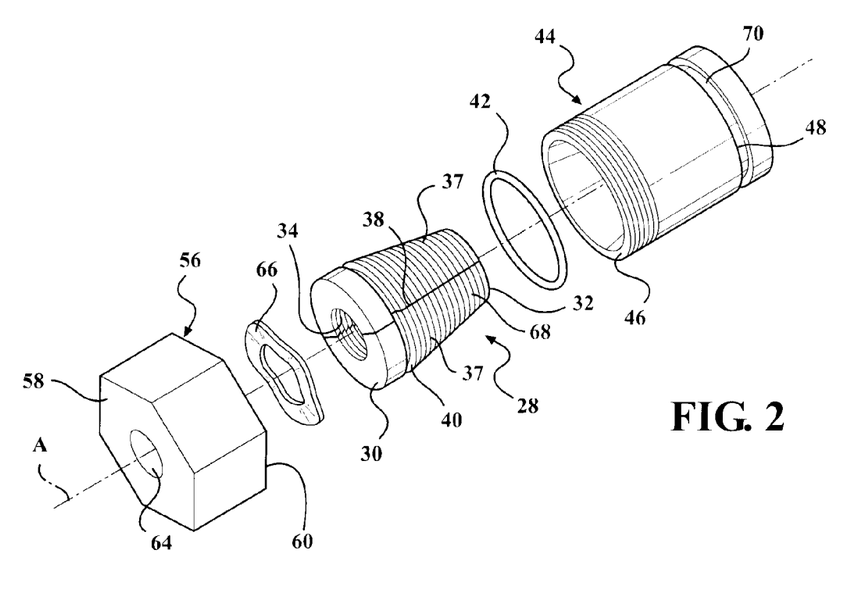
FIG. 2 is a perspective exploded view of the first enabling embodiment of the assembly.
Figure 3:
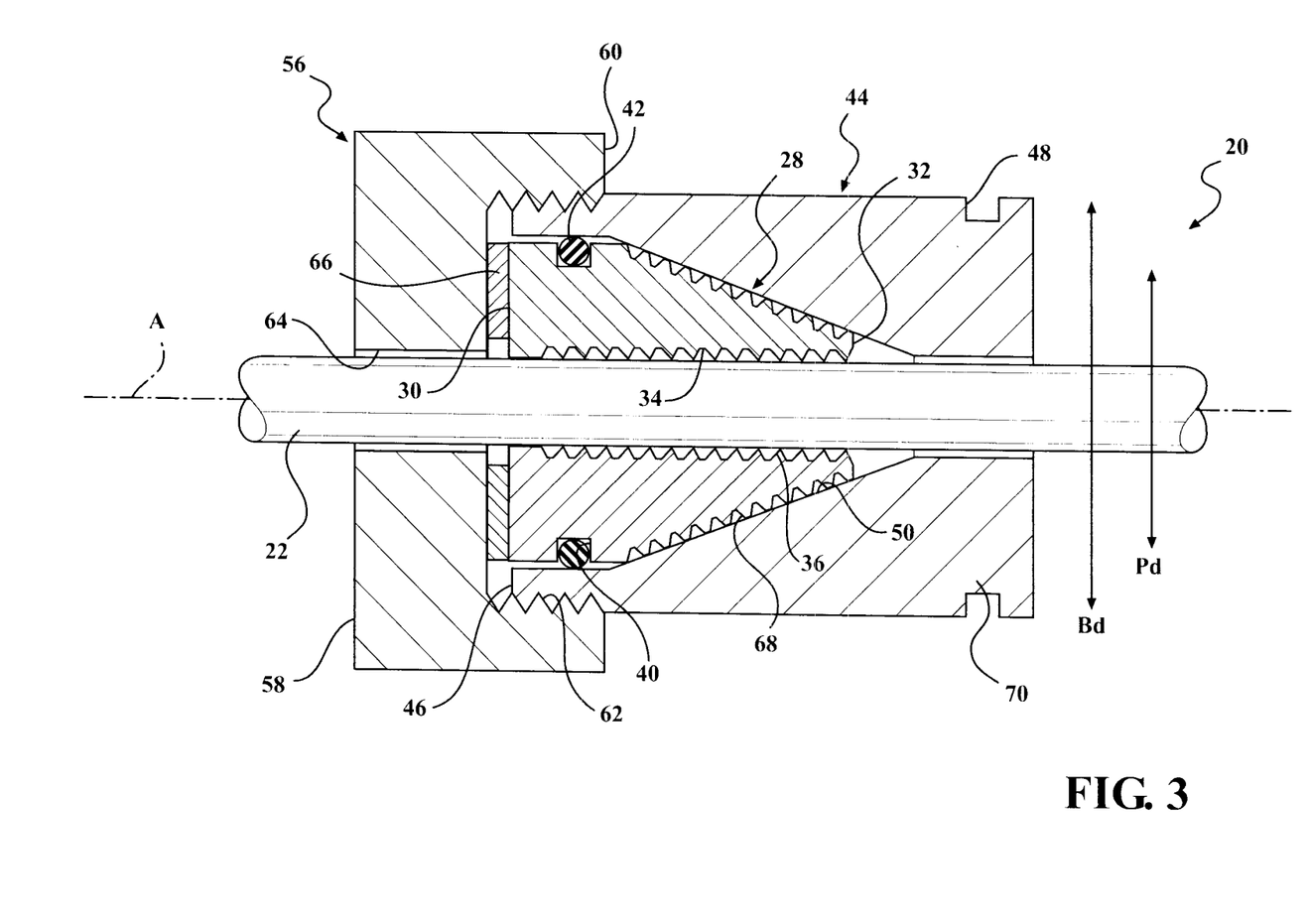
FIG. 3 is a cutaway side view of the first enabling embodiment.
Figure 4:
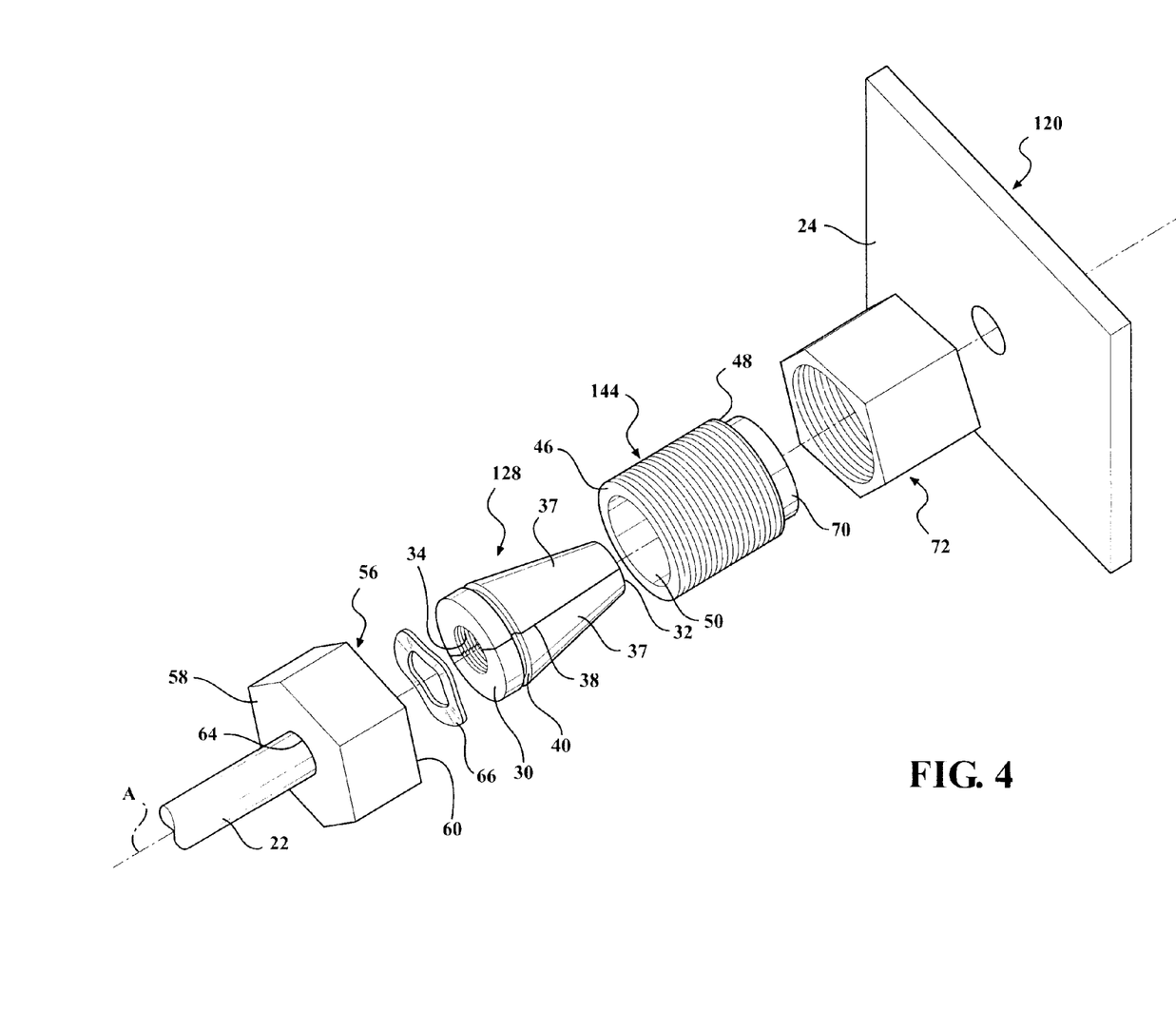
FIG. 4 is a perspective exploded view of the second enabling embodiment.
Figure 5:
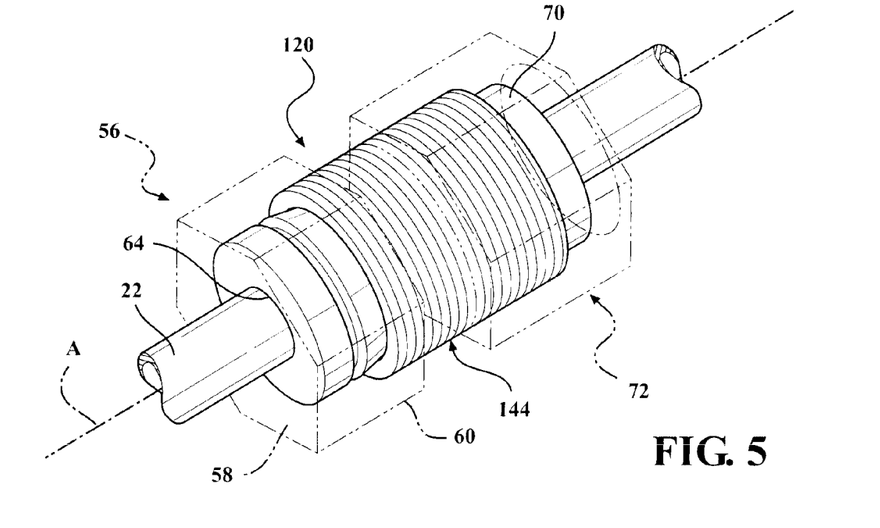
FIG. 5 is a perspective view of the second enabling embodiment with the cap and nut being transparent.
Figure 6:
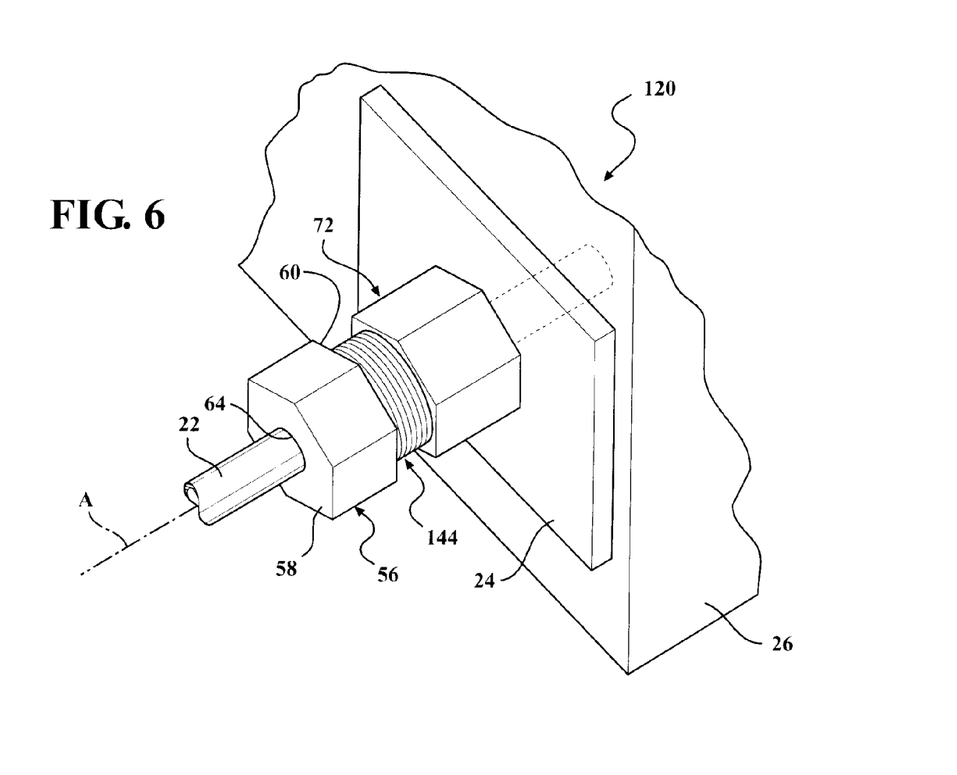
FIG. 6 is a perspective view of the second enabling embodiment.
Figure 7:
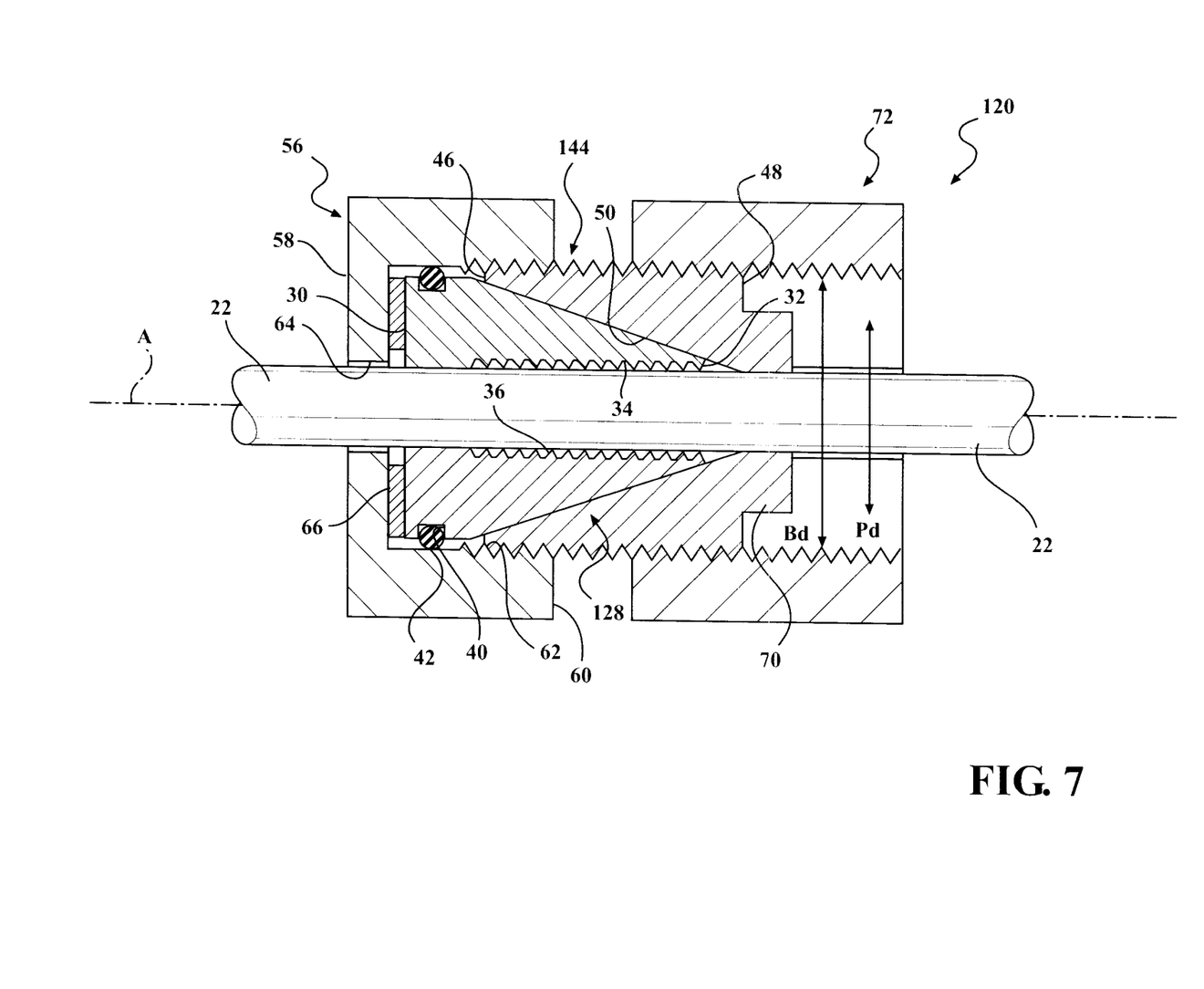
FIG. 7 is a cutaway side view of the second enabling embodiment.

In a first enabling embodiment of the assembly 20 as best presented in FIGS. 1-3, the tapered shape of the wedge 28 defines a plurality of external ribs 68 for engaging the bore 50 of the barrel 44 to provide increased friction between the wedge 28 and the bore 50. It should be appreciated that the wedge 28 of the first enabling embodiment could alternatively be constructed without the ribs 68.

In a second enabling embodiment of the assembly 120 as best presented in FIGS. 4-7, the assembly 20 includes a nut 72, generally indicated, that has a hexagonal shaped cross section 37 and internal threads is threadedly disposed about said barrel 44, 144 at said distal extremity 48 of said barrel 44, 144 for providing for an adjustable force against the plate 24.

A method for anchoring the segment of rebar 22 and the plate 24 to the mass 26 is also disclosed. The method includes the steps of extending the rebar 22 into the mass 26, extending the plate 24 about the rebar 22 axially against the mass 26, extending the bore 50 of the barrel 44, 144 about the rebar 22, extending the hollow 34 of the wedge 28, 128 about the rebar 22 axially adjacent to the plate 24, inserting the front end 32 of the wedge 28, 128 along the axis A into the bore 50 of the barrel 44, 144 at the proximal extremity 46 of the barrel 44, 144, extending the spring washer 66 about the segment of rebar 22 axially against the wedge 28, 128 to compensate for movement of the rebar 22 relative to the barrel 44, 144, threadedly tightening the cap 56 about the barrel 44, 144 in axial abutment with the spring washer 66 to close the barrel 44, 144, and compressing the wedge 28, 128 axially into the bore 50 of the barrel 44, 144 with the hydraulic actuator 52 to drive the wedge 28, 128 radially inwardly to provide for a biasing force of the wedge 28, 128 against the rebar 22 prior to said step of threadedly tightening the cap 56 about the barrel 44, 144 in axial abutment with the spring washer 66 to close the barrel 44, 144. It should be appreciated that the step of compressing the wedge 28, 128 into the bore 50 of the barrel 44, 144 could be accomplished using other compressing tools, such as but not limited to, a conventional C-clamp.

The method further includes the steps pertaining to the second enabling embodiment as best presented in FIGS. 4-7 of extending the nut 72 about the rebar 22, threadedly tightening the nut 72 about the distal extremity 48 of the barrel 44, 144, rotating the nut 72 to axially move the nut 72 against the plate 24 to provide a biasing force of the nut 72 against the plate 24.

Figure 9:
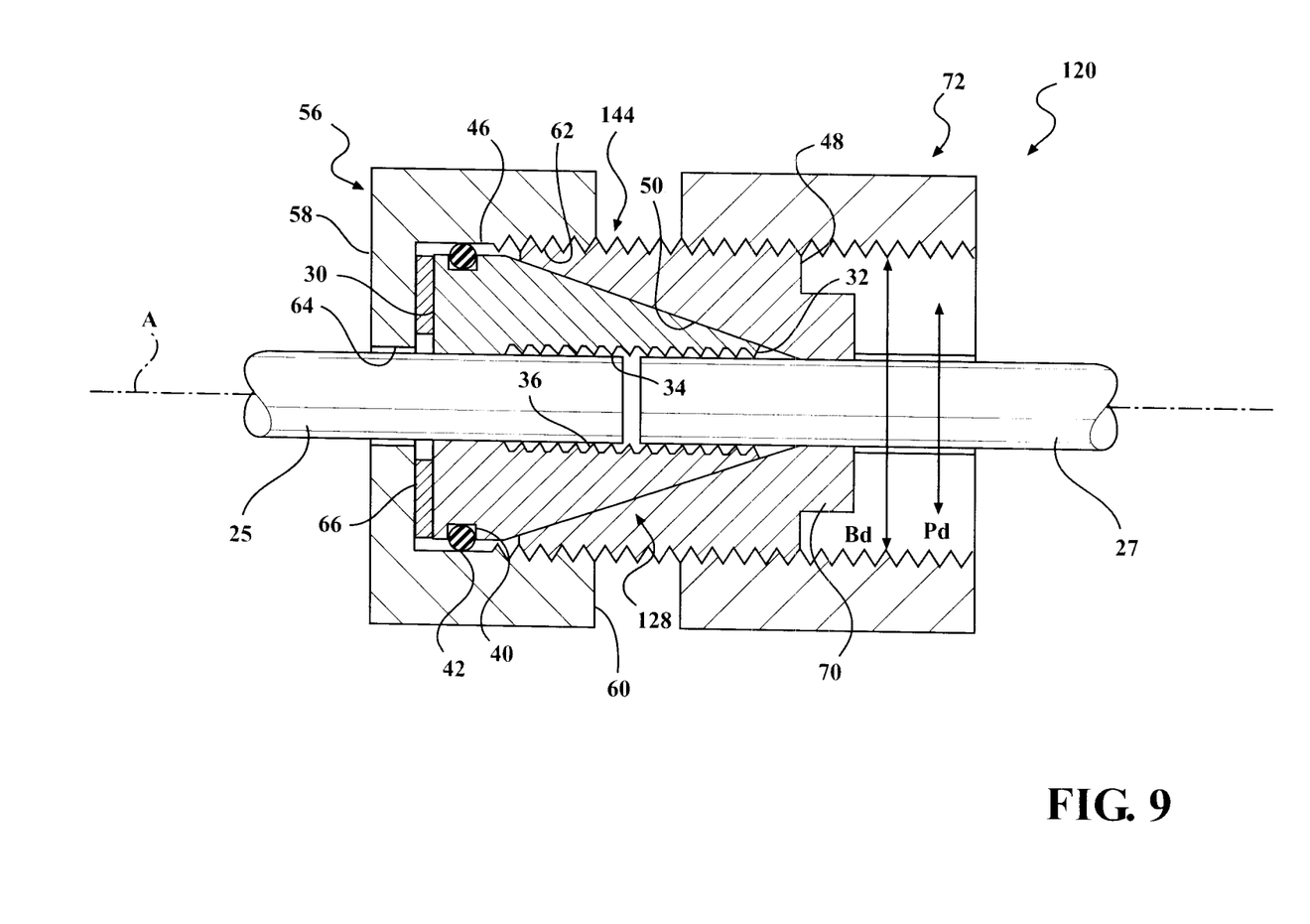
FIG. 9 is a cutaway side view of the second enabling embodiment being used to connect a first segment of rebar and a second segment of rebar.

Additionally, as best presented in FIG. 9, a method is disclosed for connecting a first segment of rebar 27 and a second segment of rebar 29 using the assembly 20, 120 of the present invention. The method includes the steps of extending the bore 50 of the barrel 144 partially about the first segment of rebar 25, extending the bore 50 of the barrel 144 partially about the second segment of rebar 27, extending the hollow 34 of the wedge 128 about the first and second segments of rebar 25, 27, connecting the cap 56 to the barrel 144 to close the barrel 144 to inhibit movement of the wedge 128 out of the barrel 144, compressing the wedge 128 axially into the bore 50 of the barrel 144 to drive the wedge 128 radially inwardly to provide for a biasing force of the wedge 128 against the first and second segments of rebar 25, 27 prior to said step of connecting the cap 56 to the barrel 144 to close the barrel 144. It should be appreciated that the same method could be used with the components of the first enabling embodiment disclosed in FIGS. 1-3.

It should be appreciated that such a method is an improvement over conventional methods of connecting two pieces of rebar since such assemblies of the prior art are typically configured to only threadedly receive segments of rebar that are threaded, leading to increased expenditures and/or preparation time as pre-threaded rebar has to be purchased, or threads need to be added to the rebar at the job site. The method and apparatus disclosed herein could advantageously be used to couple any two segments of rebar 25, 27, with or without threads. Additionally, compressing tools can advantageously be used to axially drive the wedge into the bore 50 of the barrel 144 about the first and second rebar segments 25, 27, allowing the wedge to be "preloaded" at or near yield strength of the rebar prior to placement of the cap 56. This advantageously inhibits movement of the wedge 128 relative to the segments of rebar 25, 27 in response to large external force.

Obviously, many modifications and variations of the present disclosure are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A method for anchoring a segment of rebar to a mass using a barrel extending along and about an axis and defining a bore being tapered extending therethrough along the axis and a wedge being tapered and defining a hollow extending therethrough along the axis and a cap, said method comprising the steps of:

extending the rebar axially into the mass,
extending the bore of the barrel about the rebar,
extending the hollow of the wedge about the rebar axially adjacent to the mass,
connecting the cap to the barrel to close the barrel to inhibit movement of the wedge out of the barrel,
compressing the wedge axially into the bore of the barrel to drive the wedge radially inwardly to provide for a biasing force of the wedge against the rebar prior to said step of connecting the cap to the barrel to close the barrel, and
extending a spring washer about the segment of rebar axially against the wedge to compensate for movement of the rebar relative to the barrel and to provide for more uniform compression of the cap onto the wedge.

2. The method as set forth in claim 1 wherein said step of compressing the wedge axially into the bore of the barrel includes compressing said wedge axially into the bore of the barrel using a clamping tool.

3. The method as set forth in claim 2 wherein said clamping tool is a hydraulic actuator.

4. A method for anchoring a segment of rebar to a mass using a barrel extending along and about an axis and defining a bore being tapered extending therethrough along the axis and a wedge being tapered and defining a hollow extending therethrough along the axis and a cap, said method comprising the steps of:

extending the rebar axially into the mass,
extending the bore of the barrel about the rebar,
extending the hollow of the wedge about the rebar axially adjacent to the mass,
connecting the cap to the barrel to close the barrel to inhibit movement of the wedge out of the barrel,
compressing the wedge axially into the bore of the barrel to drive the wedge radially inwardly to provide for a biasing force of the wedge against the rebar prior to said step of connecting the cap to the barrel to close the barrel,
extending a plate about the rebar axially against the mass,
threadedly extending a nut being threaded about the barrel, and
rotating the nut to axially move the nut against the plate to provide a biasing force of the nut against the plate.

5. The method as set forth in claim 4 wherein said step of compressing the wedge axially into the bore of the barrel includes compressing said wedge axially into the bore of the barrel using a clamping tool.

6. The method as set forth in claim 5 wherein said clamping tool is a hydraulic actuator.

7. A method for anchoring a segment of rebar and a plate to a mass using a barrel having a proximal extremity and a distal extremity and defining a bore extending therethrough along an axis with the bore being tapered from the proximal extremity to the distal extremity and a wedge having a frustoconical shape with a rear end and a front end and extending along the axis from the rear end to the front end with the wedge being tapered from the front end to the rear end in conformity with the bore of the barrel and the wedge defining a hollow extending therethrough along the axis and a spring washer and a cap being threaded and a hydraulic pressing tool, said method comprising the steps of;
extending the rebar into the mass,
extending the plate about the rebar axially against the mass,
extending the bore of the barrel about the rebar,
extending the hollow of the wedge about the rebar axially adjacent to the plate,
inserting the front end of the wedge along the axis into the bore of the barrel at the proximal extremity of the barrel,
extending the spring washer about the segment of rebar axially against the wedge to compensate for movement of the rebar relative to the barrel,
threadedly tightening the cap about the barrel in axial abutment with the spring washer to close the barrel, and
compressing the wedge axially into the bore of the barrel with the hydraulic actuator to drive the wedge radially inwardly to provide for a biasing force of the wedge against the rebar prior to said step of extending the spring washer about the segment of rebar and threadedly tightening the cap about the barrel in axial abutment with the spring washer to close the barrel.

8. The method as set forth in claim 7 and further including the steps of;
extending a nut being threaded about the rebar,
threadedly tightening the nut about the distal extremity of the barrel,
rotating the nut to axially move the nut against the plate to provide a biasing force of the nut against the plate.

\* \* \* \* \*